United States Patent
Alkas

(10) Patent No.: US 10,217,388 B1
(45) Date of Patent: Feb. 26, 2019

(54) DISPLAY SYSTEM

(71) Applicant: Nimlok Chicago, Niles, IL (US)

(72) Inventor: Dean Alkas, Oak Forest, IL (US)

(73) Assignee: Nimlok Chicago, Niles, IL (US)

( * ) Notice: Subject to any disclaimer, the term of this patent is extended or adjusted under 35 U.S.C. 154(b) by 0 days.

(21) Appl. No.: 15/728,791

(22) Filed: Oct. 10, 2017

(51) Int. Cl.
*G09F 15/00* (2006.01)

(52) U.S. Cl.
CPC ...... *G09F 15/0062* (2013.01); *G09F 15/0012* (2013.01)

(58) Field of Classification Search
CPC ........ G09F 15/00; E04H 1/1272; A47F 5/105; A47F 5/0018; A47G 5/00; E04B 2002/7483; E04B 2/7416; F16B 2001/0035
See application file for complete search history.

(56) References Cited

U.S. PATENT DOCUMENTS

| | | | | |
|---|---|---|---|---|
| 2,970,388 A * | 2/1961 | Yonkers | ............... | A63H 33/046 403/171 |
| 4,912,864 A * | 4/1990 | Price | ................... | A47G 1/0605 40/600 |
| 5,588,240 A | 12/1996 | Zilliox | | |
| 5,826,397 A | 10/1998 | Armold | | |
| 6,647,669 B1 * | 11/2003 | Leitner | ............... | A47B 47/0008 52/655.1 |
| 6,969,294 B2 | 11/2005 | Vicentelli | | |
| 7,437,846 B2 | 10/2008 | Franco et al. | | |
| 7,988,518 B2 * | 8/2011 | Kim | ..................... | A63H 33/046 446/129 |
| 8,070,550 B2 * | 12/2011 | Song | .................... | A63H 33/046 446/129 |
| 8,128,452 B2 * | 3/2012 | Kim | ..................... | A63H 33/046 446/129 |
| 8,146,872 B2 | 4/2012 | Koning et al. | | |
| 8,807,193 B2 * | 8/2014 | Zarelius | ............. | G09F 15/0062 160/135 |
| 9,339,129 B1 | 5/2016 | Taylor | | |
| 9,408,482 B2 | 8/2016 | Nesbitt | | |
| 9,713,397 B2 | 7/2017 | Shields | | |
| 9,728,110 B2 * | 8/2017 | Taylor | ..................... | G09F 15/00 |
| 2005/0160652 A1 | 7/2005 | Moody et al. | | |
| 2008/0006317 A1 * | 1/2008 | Livacich | ................. | E04H 15/44 135/123 |
| 2009/0100732 A1 | 4/2009 | Seidler | | |

(Continued)

FOREIGN PATENT DOCUMENTS

DE    102011012088 A1    8/2012

OTHER PUBLICATIONS

Fusion Display, "KlikDisplay" YouTube video, downloaded from the Internet at https://youtu.be/xZQWF9WXswk on Sep. 20, 2017, 3 pp. (Dec. 9, 2014).

(Continued)

*Primary Examiner* — Cassandra Davis
(74) *Attorney, Agent, or Firm* — Leydig, Voit & Mayer, Ltd.

(57) ABSTRACT

A display system including a first display frame including a plurality of frame members interconnected by junction connectors. The plurality of frame members each have a hollow interior. One or more diametrically polarized magnets is disposed to rotate freely within the hollow interior of at least one of the frame members.

20 Claims, 13 Drawing Sheets

(56) References Cited

U.S. PATENT DOCUMENTS

| | | | |
|---|---|---|---|
| 2010/0087119 A1* | 4/2010 | Vicentelli | A63H 33/046 |
| | | | 446/92 |
| 2010/0229439 A1 | 9/2010 | Elliot | |
| 2010/0251659 A1 | 10/2010 | Hughes | |
| 2012/0285060 A1 | 11/2012 | Gross et al. | |
| 2016/0074766 A1* | 3/2016 | Choi | A63H 33/046 |
| | | | 446/92 |
| 2016/0135619 A1 | 5/2016 | Shields et al. | |
| 2016/0249750 A1 | 9/2016 | Taylor et al. | |

OTHER PUBLICATIONS

Fusion Display, "Fusion Imaging Klik Magnetic Display System," downloaded from the Internet at http://www.fusionimaging.com/klik-magnetic-display-system/ on Sep. 20, 2017, 2 pp. (2015).

Quantum Portable Architecture, "Our Products," downloaded from the Internet at http://quantum-stands.com/index.php/our-products on Oct. 10, 2017, 4 pp. (2017).

* cited by examiner

DISPLAY SYSTEM

TECHNICAL FIELD

The present disclosure relates to displays such as trade show displays, and to methods of coupling structural members and accessories in displays.

BACKGROUND

Typically, displays use one or more frames, which are configured to carry rigid or flexible panels with artwork and/or messaging provided on the panels. The frames may be modular and may include two or more frames attached together with hardware, such as conventional fasteners and brackets, to form frame assemblies with a corresponding amount of display area while providing for easy transport when disassembled. Another attachment method may employ magnetic couplers fixed on the display frames that relies on the magnetic attraction of the magnets to hold adjacent frames together in position. The placement and pole orientation of the magnets on the frames determines the resultant configuration of the assemblies and requires careful alignment of the frames to securely couple the frames together. In this respect, existing displays assemble into predetermined configurations, and thus tend to lack flexibility as to geometry and ease of installation.

One example of a previously proposed display utilizing magnetic couplers can be seen in U.S. Pat. No. 9,713,397 ("Shields"), in which magnets disposed at corners of picture frames are used to attach adjacent frames. While the magnets of Shields are effective in attaching frames to one another, the polarity orientation and location of the magnets in the frame corners limit the relative frame connection options.

Another example can be seen in U.S. Pat. No. 9,728,110 ("Taylor"), which describes, in one embodiment, magnets attached to swivel joints along a frame support member. The magnets, which are oriented perpendicularly to the centerline of the frame support, are arranged to swivel about the centerline and at a distance therefrom. In this arrangement, the ability to connect adjacent frames still depends on the polarity orientation of the magnets.

SUMMARY OF THE DISCLOSURE

One aspect of the disclosure is a display system including a first display frame including a plurality of frame members interconnected by junction connectors. The plurality of frame members each has a hollow interior. One or more diametrically polarized magnet is disposed to rotate freely within the hollow interior of at least one of the frame members.

Further and alternative aspects and features of the disclosed principles will be appreciated from the following detailed description and the accompanying drawings. As will be appreciated, the principles related to covers for closures disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims. The terms configured and configuration may be used herein to refer to a specified structural size and shape.

Figure 1:
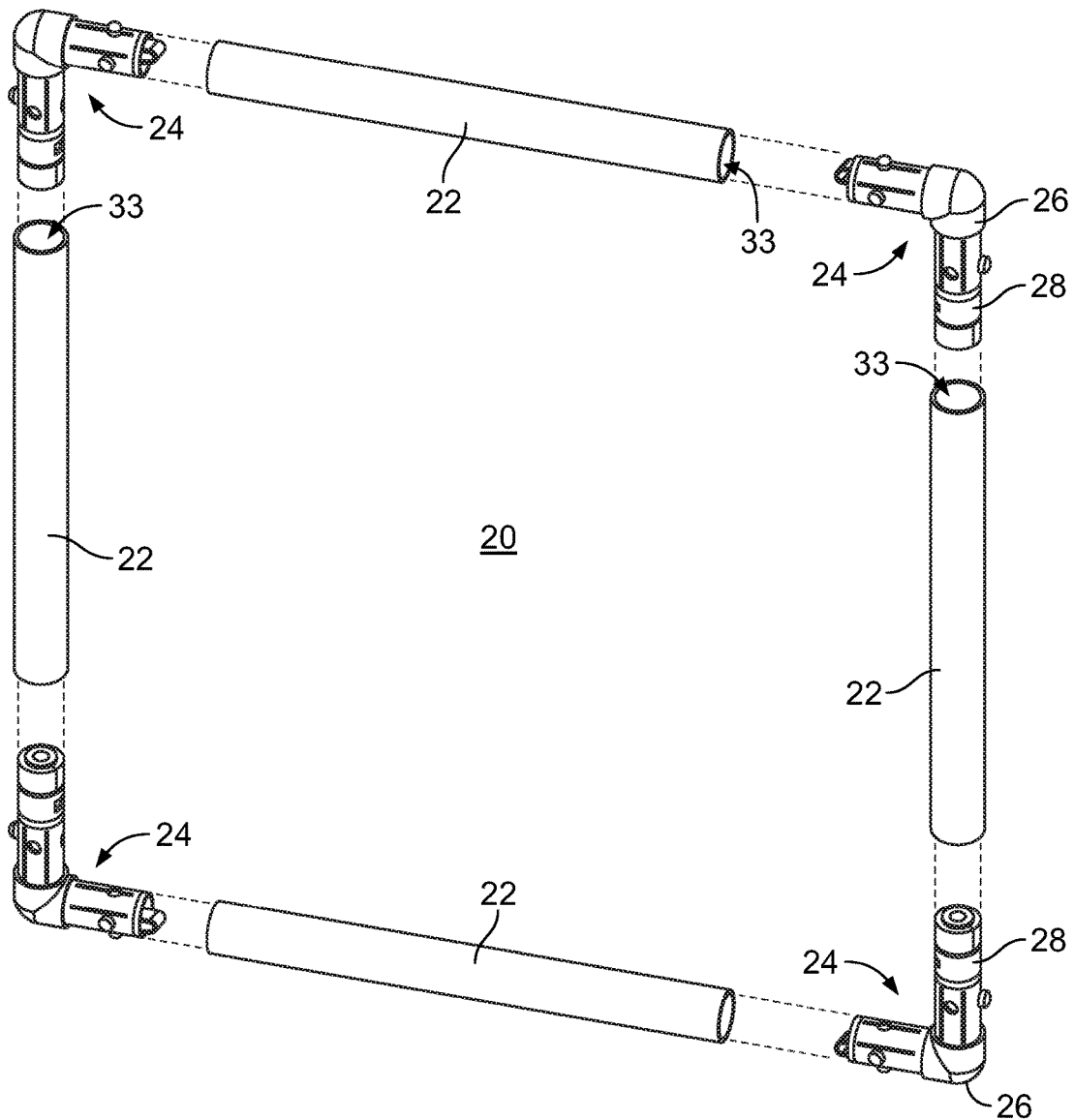
FIG. 1 is an exploded, perspective view of a frame.
Figure 2:
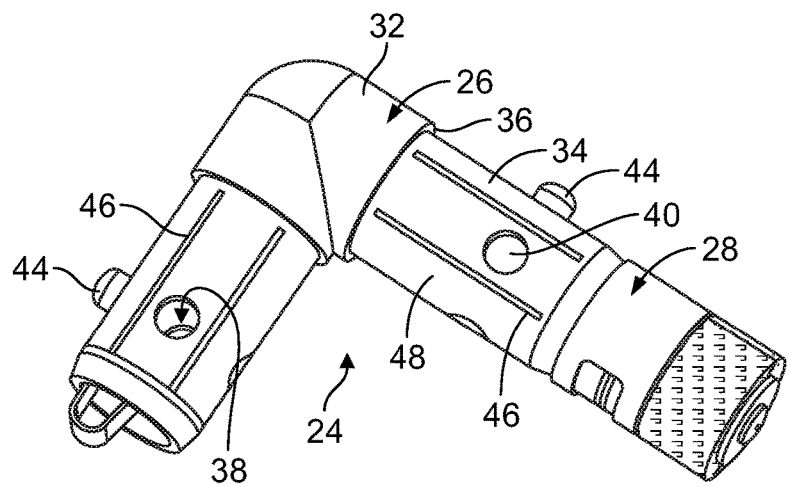
FIG. 2 is a perspective view of a tube connector assembly.
Figure 3:
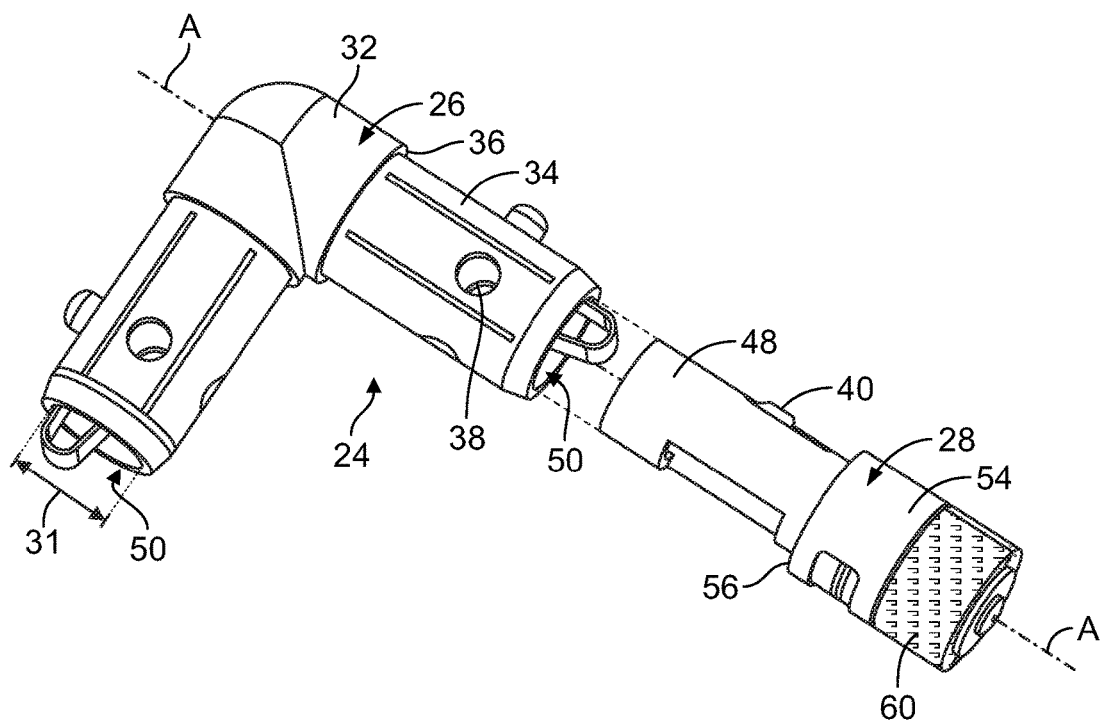
FIG. 3 is an exploded, perspective view of the tube connector assembly of FIG. 2.
Figure 4:
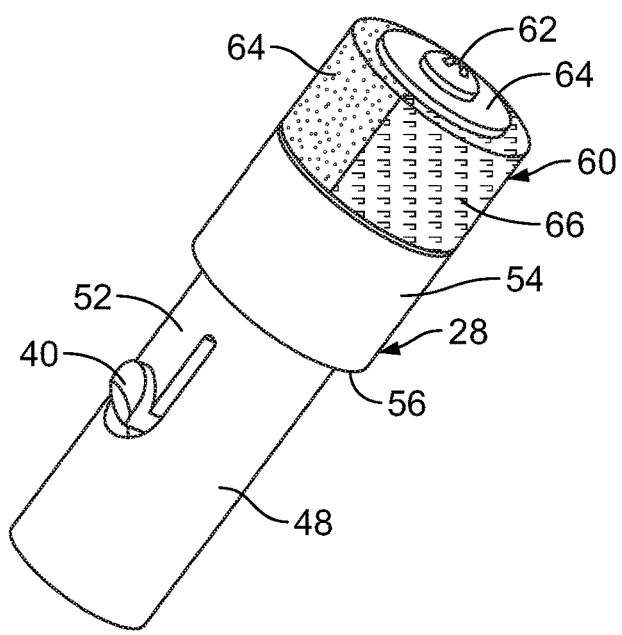
FIG. 4 is a perspective view of a magnetic assembly.

FIG. 1 illustrates a single frame 20. The frame 20 may be constructed of frame members 22 interconnected by tube connector assemblies 24. Each tube connector assembly 24 includes a junction connector 26 and one or more magnetic assembly 28.

Figure 7:
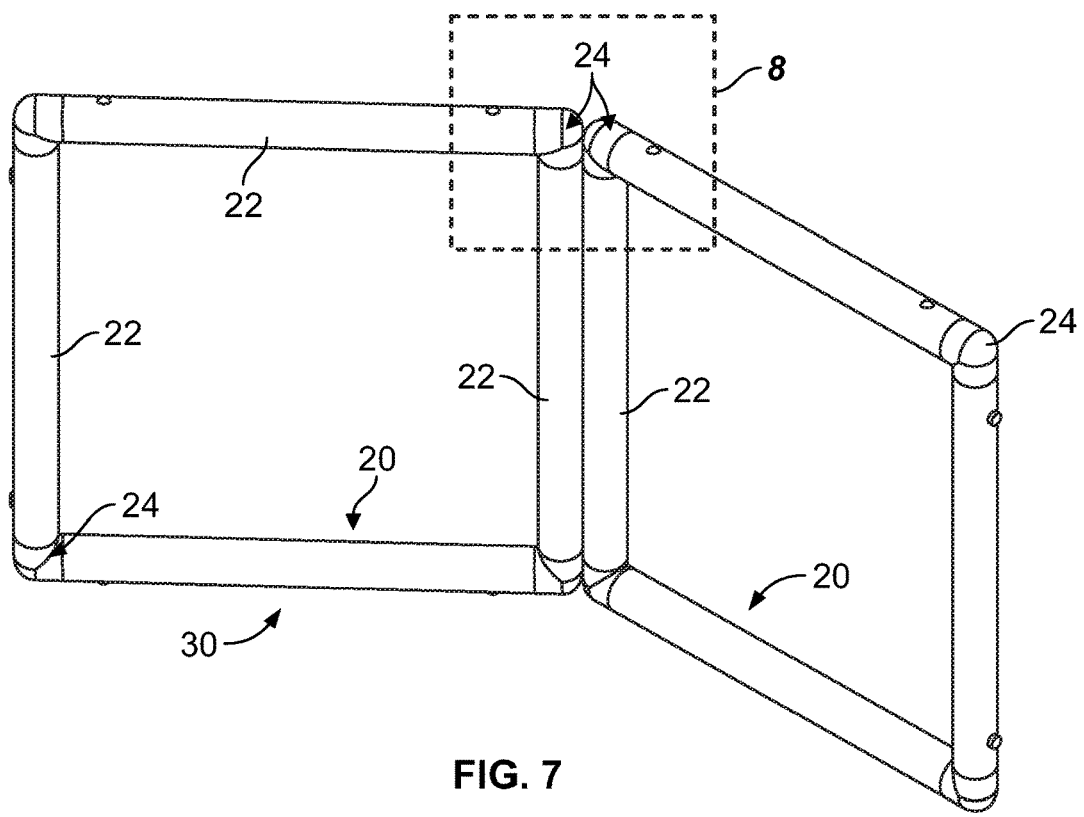
FIG. 7 is a perspective view of two of the frames of FIG. 6 coupled together.

Two or more frames 20 may be coupled together through magnetic interaction of adjacent magnetic assemblies 28 disposed within display assemblies 30 (FIG. 7). It will be understood that once assembled, each frame 20 may be provided with one or more display panel or display element (not shown) with text, and/or images or any desirable information displayed thereon as is known in the art, for example on a substrate, a fabric, a rigid panel, or electronic displays. Advantageously, the internal placement of the magnetic elements within the frames permits the unobstructed outer profile of the frames to be preserved so as not to interrupt the graphics appearing on the external surfaces of the frames. Alternatively, two or more of the frames 20 may be provided with a single panel or display element that is supported by the coupled frames.

Each frame member 22 may be an elongate, hollow member of any suitable shape, cross sectional profile and extent. Frame members 22 may be constructed of metal, plastic, composites or any suitable material. One embodiment contemplates frame members 22 made of aluminum. Each frame member 22 may be cylindrical and hollow and is sized and shaped to receive part or all of a tube connector assembly 24 in each open end 30 of each frame member. The size and shape of each frame member 22 defines an opening at each open frame member end 33 with an internal diameter 31 that receives part of a junction connector 26 and in some embodiments also a magnetic assembly 28 therein to provide a secure fit of the frame member and tube connector assembly 24 at the open end. It will be understood that in embodiments where the frame member 22 is not cylindrical, that the tube connector assembly 24 will be likewise configured to be a secure fit thereto. In one contemplated example, the frame member may have a hexagonal or octagonal cross section. In the illustrated embodiment, the open frame members 33 are tubular with a hollow interior that extends along the entire length of the frame member around a centerline.

Turning to FIGS. 2-5, each tube connector assembly 24 may include a junction connector 26 and a magnetic assembly 28 attached to the junction connector. Junction connector 26 may be made of any suitable material, for example metal, plastic, or composite materials. The magnetic assembly 28 may be releasably connected to the junction connector 26 by way of any suitable connection. Alternatively, the magnetic assembly 28 may be permanently connected to the junction connector 26, by press fit, an adhesive, or any suitable securement.

The junction connector 26 includes a connector body 32 and may include a pair of connector tenons 34 extending from the connector body. Alternatively, the connector body 32 may include more than two extending tenons, for example in a X, Y, Z orthogonal configuration. These tenons fit within mortise holes, which in the illustrated embodiments are made from the hollow interiors of the frame members.

The connector body 32 may be in the shape of an elbow and may support tenons 34 in an angled or straight configuration. In one embodiment, the connector body 32 supports tenons 34 at an angle of about 90 degrees. The body 32 may include a shoulder 36 at the junction of the body and tenons 34. The shoulder 36 forms a stop for a frame member 22 when inserted over one of the tenons 34 and advanced toward the body 32. In an embodiment where the frame member 22 is cylindrical, the shoulder 36 is annular and extends radially.

The tenons 34 may be cylindrical and each with an axis A. As shown, the axis A coincides with the centerline of the open frame members 31 when the tube connector assembly 24 is installed into an open frame member 31. The two axes A of the illustrated embodiment are oriented 90 degrees relative to each other as a result of the extending alignment of the tenons 34 on the connector body 32. In one embodiment, where the tenons 34 are arranged to yield axes that are aligned with each other, i.e., wherein the connector body 32 is straight, the angle between the tenons may be considered to be zero or 180 degrees. In one embodiment, the tenons 34 have identical axes, and in another embodiment, the tenons may be offset from each other, wherein the axes are parallel to each other but laterally displaced and thus not the same.

The tenons 34 may include one or more opening 38. The openings 38 may be circular or any suitable shape for receiving a corresponding, biased tab 40 located on the magnetic assembly 28. When the magnetic assembly 28 is inserted into a tenon 34 the tab 40 is either manually depressed or is configured to be depressed by the tenon, and when the tab becomes aligned with one of the openings 38 is springs into the opening where it makes a locking contact with the edge of the opening. In this manner, the magnetic assembly 28 is secured to the tenon 34. Causing the tab 40 to be depressed permits disengagement of the tab from the opening 38 and disassembly of the magnetic assembly 28 from the junction connector 26.

The tenon 34 may also include a biased tube engagement mechanism 42. The tube engagement mechanism 42 may include a spring loaded button 44 that engages a hole (not shown) in a frame member 22 in much the same fashion as tab 40 engages opening 38 for attaching a frame member to a tube connector assembly 24.

The tenons 34 each may further include at least one guide ridge 46 that extends longitudinally along the axis A of the tenon. The guide ridge 46 functions to guide the frame member 22 as the frame member is drawn over the tenon and functions to space the frame member from the outer surface 48 of the tenon. Thus, the tab 40 may be positioned in an engagement position relative to the opening 38 and slightly proud of the outer surface 48 so that the tab may be depressed manually if needed. Furthermore, the space provided or at least a guide function eases the frame member 22 onto the tenon 34 with less friction than a plain joint and while providing easy passage of air through the joint.

Each magnetic assembly 28 may include a rod portion 48, which may be configured to fit into an interior 50 of a tenon 34. The rod portion 48 includes the tab 40. The tab 40 may be formed on the end of a flexible leg 52, which provides the bias or spring function of the tab. The rod portion 48 widens to a head portion 54, which is radially wider than the rod portion. A shoulder 56 is formed between the rod portion 48 and the head portion 54 that is sized and shaped to abut the end of the tenon 34 when the rod portion is fully inserted into the interior 50 of the tenon and the tab 40 engages the opening 38.

Figure 5:
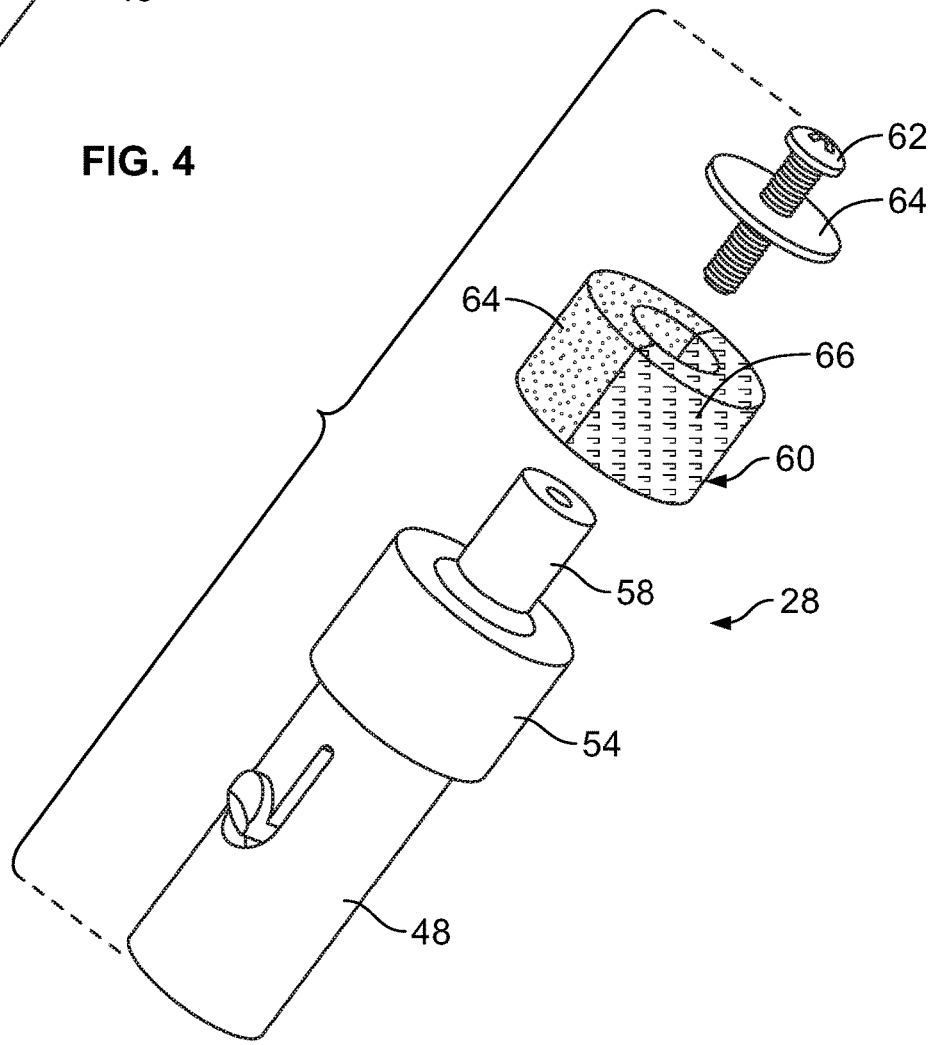
FIG. 5 is an exploded, perspective view of the magnetic assembly of FIG. 4.

Referring to FIG. 5, on the end of the head portion 54, opposite the rod portion 48, is formed a cylindrical post 58. The post 58 has a radial diameter that is less that of the head portion 54 and is sized and shaped to rotatably receive a magnet 60 thereupon. The magnet 60 may be held on the post 58 with a fastener 63 and washer 65 or any suitable fastening mechanism, provided the fastening mechanism permits free rotation of the magnet 60 on the post 58 and about the axis A.

The magnet 60 is sized and shaped to have a radial clearance within the inner diameter or space of frame member in which it is installed such that the magnet can rotate within the frame member 22 when the frame 20 is assembled. Accordingly, the magnet 60 freely orients in a manner so as to self align and generate attractive forces in combination with an adjacent magnetic assembly 28 of an adjacent frame 20. In other words, the size and shape of the magnet 60 permits free movement on the post 58 and inside a frame member 22 when assembled to a magnetic assembly 28 and a tube connector assembly 24.

The magnet 60 is a diametrically magnetized ring shape (vs. an axially magnetized ring or, in general, an axially polarized magnet such as in the Shields and Taylor references discussed previously), which has its North and South poles disposed on diametrically opposite locations around the ring shape. The magnet 60 may be cylindrical with an axial bore 62 that rotatably fits on the post 58. The magnet 60 may rotate such that the polarity of the magnet (i.e., left and right side of the ring has different polarity vs. the polar axial ends) can orient itself based on nearby magnetic fields and polarity as will be shown in more detail hereinbelow. Referring to FIG. 5, for example, the upper left side 64 of magnet 60 may be positive and the lower right side 66 may be negative.

Figure 6:
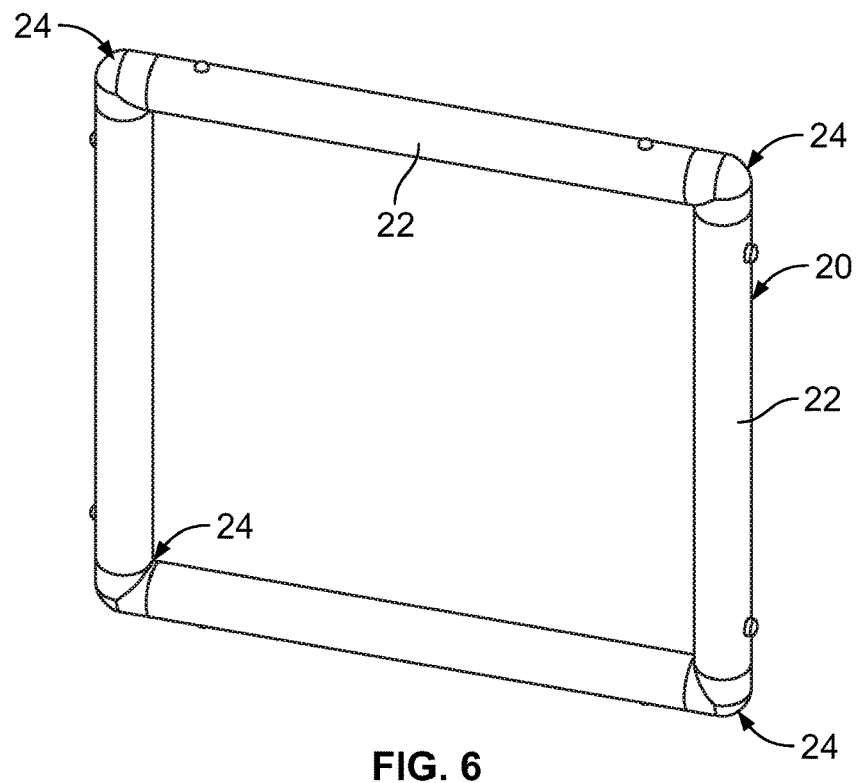
FIG. 6 is a perspective view of an assembled frame.
Figure 8:
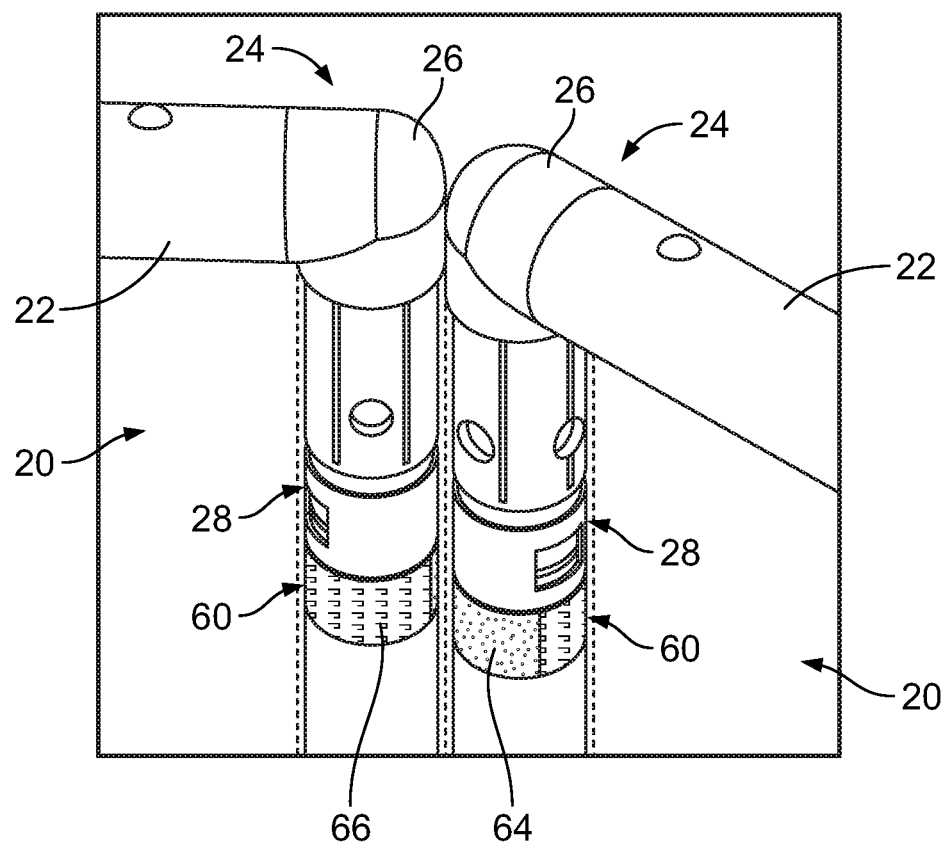
FIG. 8 is a cut-away, partial perspective view of two adjacent frames shown in FIG. 7, with adjacent tube connector assemblies in position to be coupled magnetically.
Figure 9:
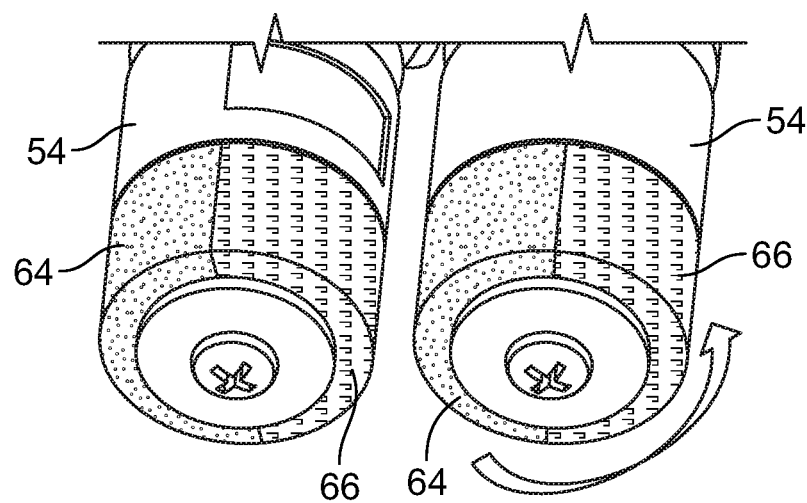
FIG. 9 is a close-up view of two adjacent magnetic assemblies to illustrate the magnets in a coupled orientation.

FIGS. 6 and 7 show, respectively, an assembled frame 20 with frame members 22 interconnected via tube connector assemblies 24 at the corners thereof. FIG. 7 shows two frames 20 assembled into a display assembly 30 and wherein the two frames form an angled or open book configuration. Advantageously, the two frame members 22 can be connected at any desired angle, or at infinite angles, relative to one another. FIG. 8 shows a close-up view of the tube connector assemblies 24 assembled to frame members 22. The junction connector 26 portion of the tube connector assemblies for the corner of the frame 20. The tenons 34 and magnetic assemblies 28 of the tube connector assemblies 24 are disposed within frame members 22. The magnets 60 are positioned adjacent each other when frames 20 are disposed each other to form display assembly 30. Each magnet 60, due to the free rotation mounting and configuration of the magnetic assembly 28, can orient itself to attract to an adjacent one of the magnets without loss of magnetic attractive force regardless of orientation of the frames because a positive side 64 rotates to be closest to a negative side 66 of an adjacent magnet as shown in FIG. 9, and vice versa. Thus, the frames 20 become magnetically coupled and maintain the separate frames into a display assembly 30.

Figure 10:
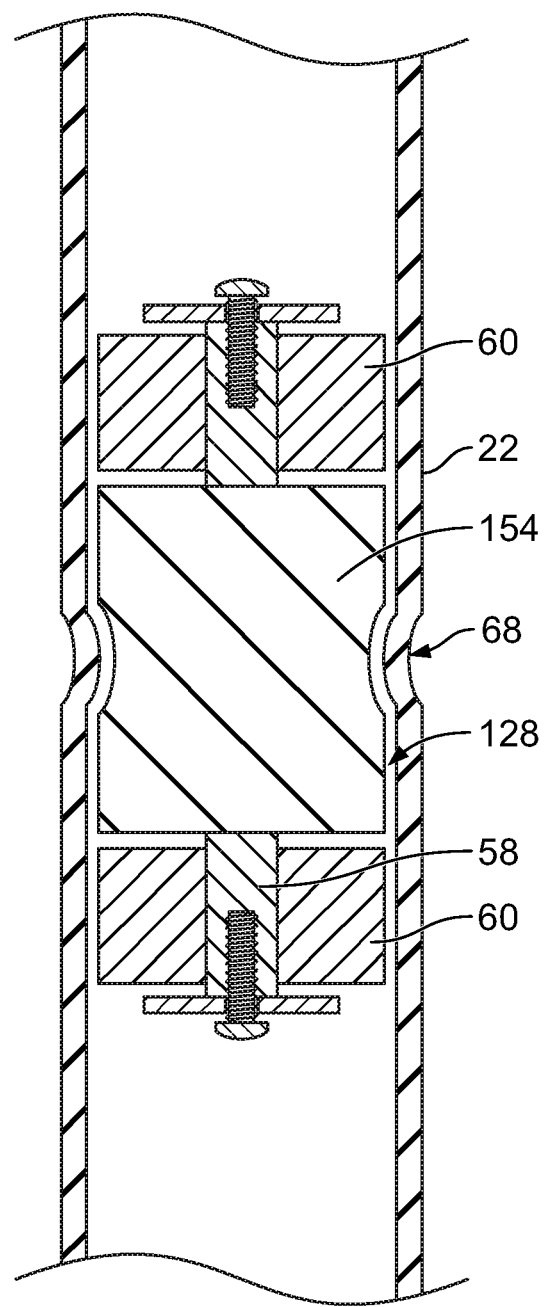
FIG. 10 is a cross section side view of an embodiment of a magnetic assembly secured inside a frame member.
Figure 11:
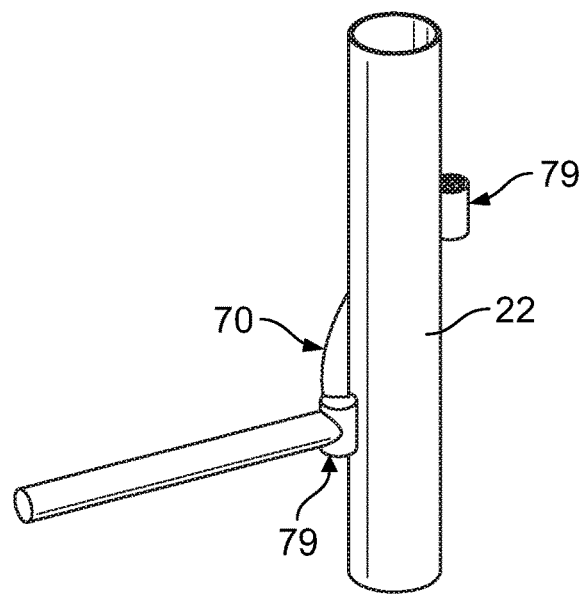
FIG. 11 is a perspective front view of an accessory bracket attached to a tube.
Figure 12:
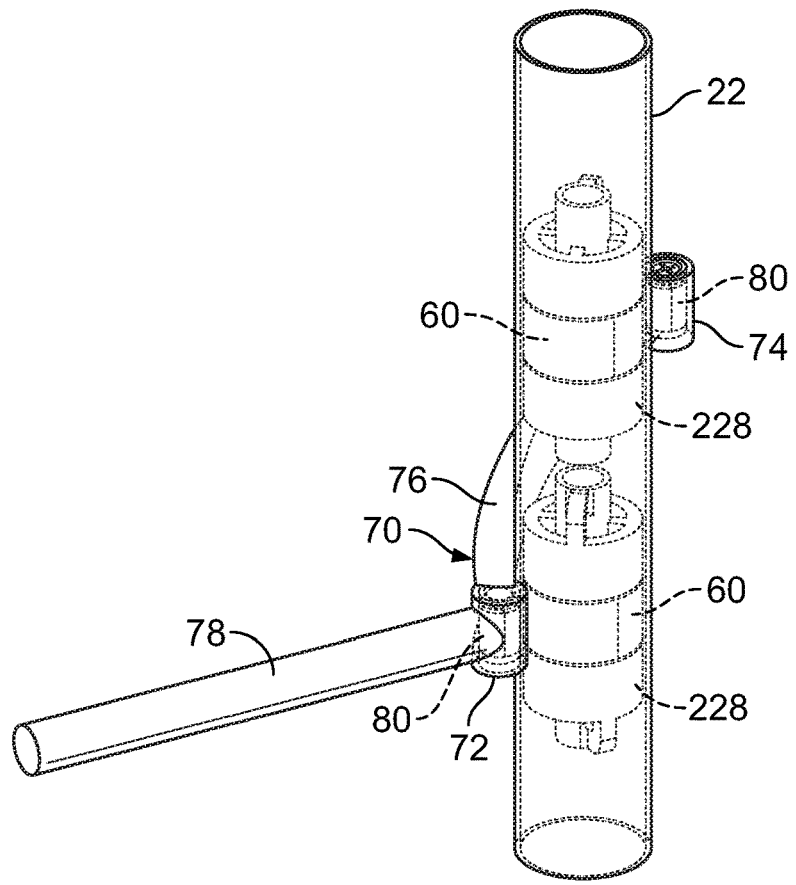
FIG. 12 is a cutaway view of the accessory bracket and tube of FIG. 11.
Figure 13:
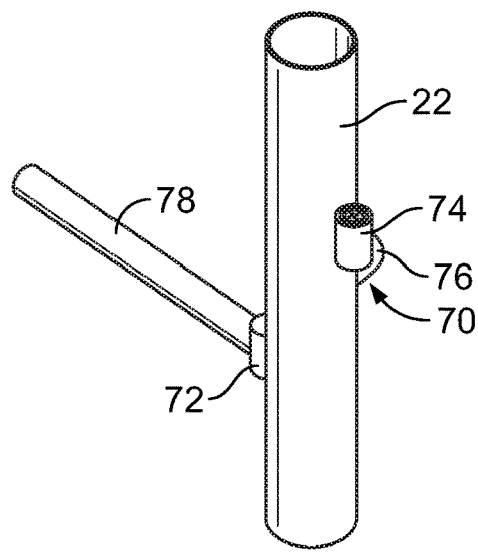
FIG. 13 is a perspective rear view of an accessory bracket attached to a tube.
Figure 14:
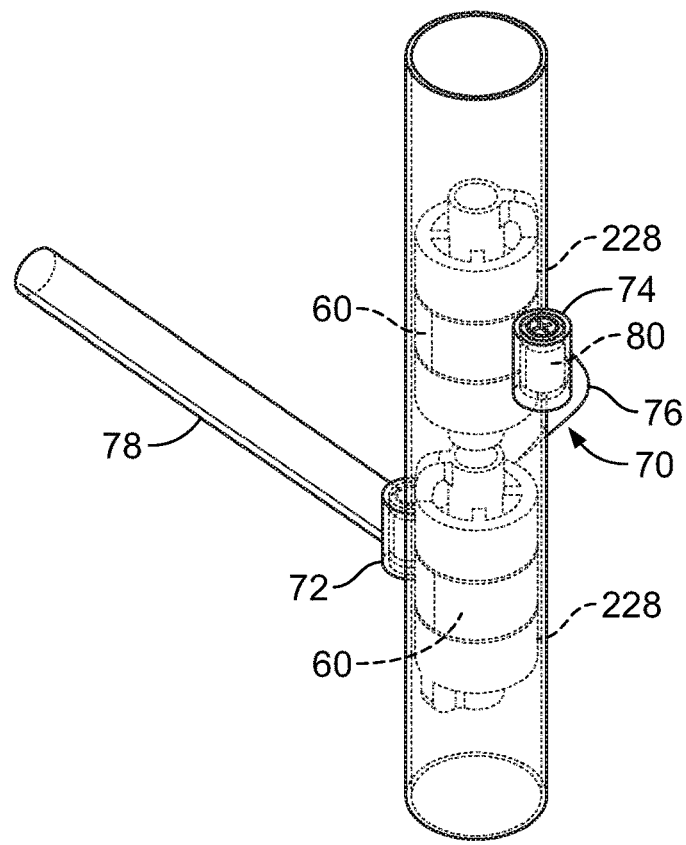
FIG. 14 is a cutaway view of the accessory bracket and tube of FIG. 13.
Figure 15:
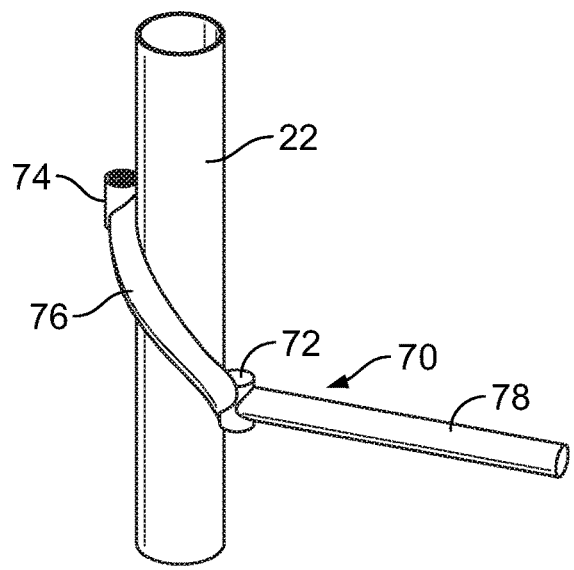
FIG. 15 is a perspective side view of an accessory bracket attached to a tube.
Figure 16:
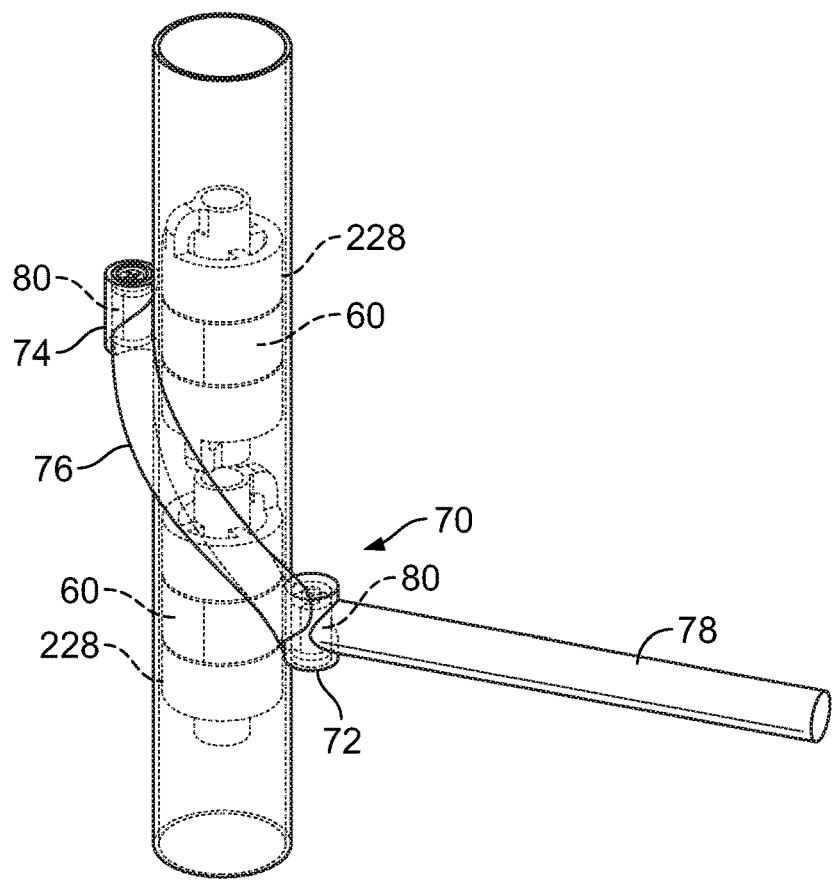
FIG. 16 is a cutaway view of the accessory bracket and tube of FIG. 15.

FIG. 10 shows a cross section view of an embodiment of a magnetic assembly 128 disposed within a frame member 22 for coupling adjacent frames into the configuration shown in FIG. 7. It will be understood that frames will be assembled with frame members 22 like that detailed above, which frame members are interconnected with junction connectors like those detailed above. However, the magnetic assembly 128 disclosed herein may be disposed in a corresponding frame member between the ends of the frame member, and in one embodiment about mid-way between the ends of the frame member or at any other desired location along the centerline of the respective hollow tubular member.

Each magnetic assembly 128 includes a modified head portion 154 that rotatably accommodates one or two magnets 60. In one embodiment, the head portion 154 includes a magnet 60 rotatably attached to one end of the head portion. In another embodiment, the head portion 154 includes two magnets 60, each of which is attached at opposite ends of the head portion on a respective post 58 constructed as in the embodiments disclosed in FIG. 5, for example, and secured in like fashion.

The magnetic assembly 128 can be secured in position within the hollow tubular opening of a structural member of the frame member 22 by any suitable method. One embodiment employs use of an magnet moved externally of the frame member 22 to magnetically position the magnetic assembly 128 at an approximate mid-point of the frame member in which the assembly has been inserted. The frame member 22 may be peened to create one or more indentation 68 that pinches and secures the head portion 154 within the frame member, leaving the magnets 60 to rotate with the frame member for proper self-orientation when brought into the magnetic influence of an adjacent magnet similarly positioned within an adjacent frame member of an adjacent frame or an accessory that is mounted on the frame. Other suitable methods may be employed, such as standard fasteners. For example, a screw, bolt, or pin may be inserted through the frame member and into the material of the head portion 154 to fasten the magnetic assembly 128 into position.

After assembly, frames 20 may be easily assembled into multi-frame display assemblies quickly, reversibly, without tools or other fasteners, by bringing two or more frames into close association or physically into contact, whereby the internal, freely-rotatable magnets self-align and create a magnetic attractive force that magnetically couples adjacent frames together. Reversing the coupling process by separating adjacent frames is simple, quick and requires no tools or manipulation of any fastening devices.

Turning to FIGS. 11-23, an embodiment of an accessory bracket 70 is shown. The accessory bracket 70 is attachable to a tube 22 such as a cylindrical tube of a frame according to embodiments of the disclosure. The accessory bracket 70 includes at least a first attachment node 72. In the illustrated embodiment, the accessory bracket 70 also includes a second attachment node 74. The first and second attachment nodes 72, 74 are connected to each other with an attachment arm 76. The bracket 70 includes an accessory support 78 that may be attached to or extend from the first attachment node 72. The relative positions of the first and second attachment nodes 72, 74 and the shape of the attachment arm 76 permit the accessory bracket 70 to releasably attach to tube 22. The accessory bracket 70 may be made of metal, plastic, composite materials or any suitable material. Parts of, or the entire, accessory bracket 70 may be provided with a grip coating 79 to increase the grip or feel of the part against the tube. For example, the first and second attachment nodes 72, 74 may be provided with an elastomeric or rubber coating, a cork layer, felt material and the like.

Figure 17:
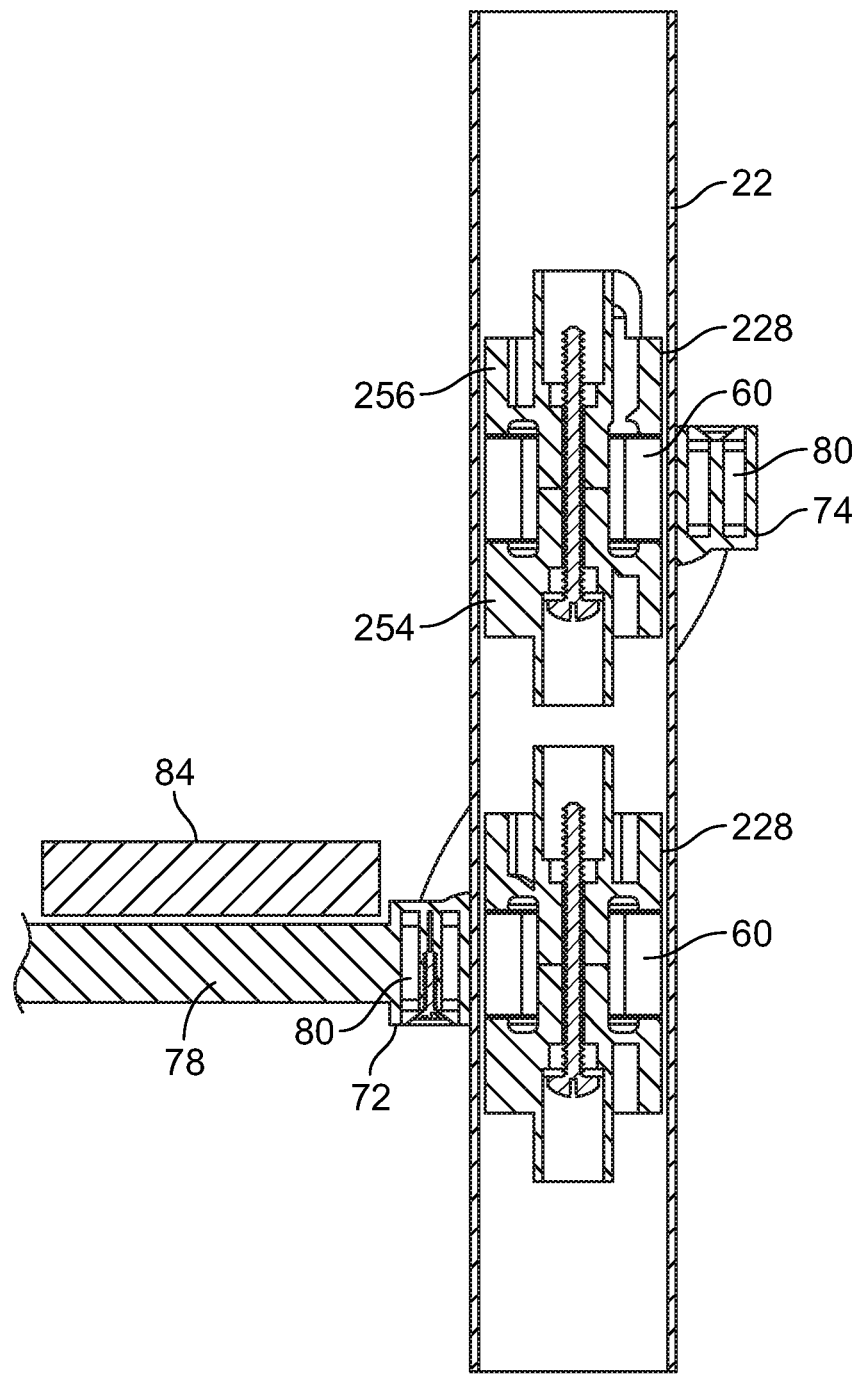
FIG. 17 is a section view of an accessory bracket attached to a tube with magnetic assemblies.
Figure 18:
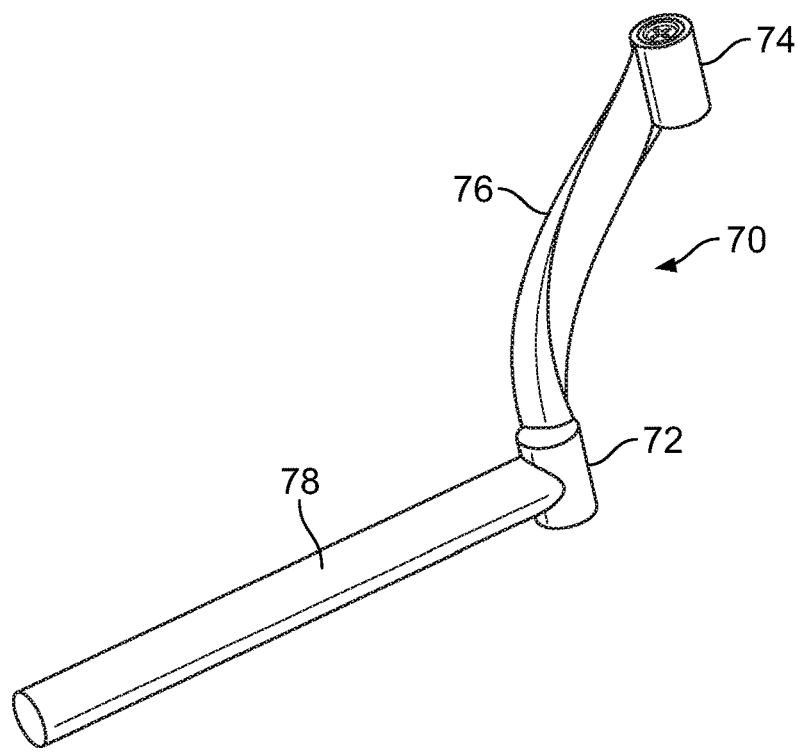
FIG. 18 is a perspective view of an accessory bracket.
Figure 19:
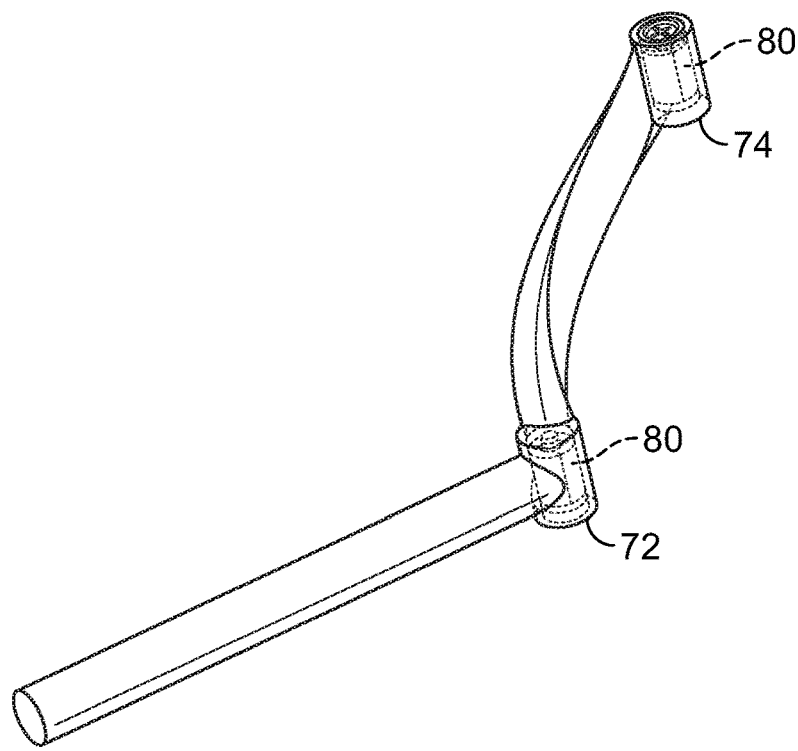
FIG. 19 is a cutaway view of the accessory bracket of FIG. 18.

The accessory support 78, which in the illustrated embodiment may be a rod-shaped element, is configured to support one or more of a shelf, a panel, a display, one or more product, or any manufactured good or article supportable by the support and the tube 22. FIG. 17 shows one example of a shelf 84 mounted to support 78 as an example of an accessory. The accessory support 78 may include any suitable shape, such as a rod, ring, hook, opening, teeth or any configuration that permits the support to hold, position, secure or otherwise support an accessory. Moreover, the accessory support 78 may be integrated into a product display rack or other type of accessory.

The shape and size of the attachment arm 76 positions the first and second attachment nodes 72, 74 on opposite sides of the tube 22. The attachment arm 76 may be arcuate and curved to match or complement the outer shape of tube 22. The attachment arm 76 positions the second attachment node 74 at a higher vertical position relative to the first attachment node 72. The first attachment node 72 thus acts as a fulcrum and the leverage imparted to the second attachment node 74 causes the first and second attachment node to pinch together against the tube 22, thereby securing the accessory bracket 70 in position on the tube, especially when the support 78 is weighted.

The first and second attachment nodes 72, 74 include magnets or ferrous metal inserts 80 that utilize magnetic attraction to position and retain the accessory support 70 in a desired location on tube 22 in cooperation with at least one magnet 60 within the tube 22 (see FIG. 17). The inserts 80 are molded or housed within the nodes 72, 74. In one embodiment, the inserts 80 are disposed within the nodes 72, 74 so as to rotate and in another embodiment, the inserts are non-rotatable. The inserts 80 may each be a diametrically magnetized ring.

FIG. 17 shows tube 22 with at least one magnetic assembly 228, and in one embodiment a pair of magnetic assemblies 228, disposed in tube and spaced apart a distance that cooperates with the spacing of the first and second nodes 72, 74. The magnetic assemblies 228 are permitted to move freely along the interior of tube 22 or are secured in a selected position.

Each of the magnetic assemblies 228 includes a diametrically magnetized ring shaped magnet 60 that is rotatable as in the above embodiments. The magnetic assemblies 228 may be fixed in a selected location when it is desired to locate the accessory support 70 in a predetermined position on tube 22. The magnetic assemblies 228 may be fixed according to the same method as the embodiment of FIG. 10, i.e., by peening the tube with the assembly in position. Alternatively, the pair of magnetic assemblies 228 are permitted to move freely within the tube and thus provide for flexible location of the accessory support 70 along the length of the tube 22.

Each magnetic assembly 228 may be constructed of a pair of head portions 254, 256. The two head portions 254, 256 are shaped and sized to be received within tube 22. When assembled the two head portions 254, 256 capture magnet 60 therebetween and are shaped and sized to permit free rotation of the magnet in place in the tube 22. The two head portions 254, 256 may be fastened together with a threaded fastener 63 that is received in one of the two head portions. The fastener 63 secures to a nut 82 that is held captive in the other of the two head portions.

In the embodiment shown in FIG. 17, a shelf 84 is shown in cross section to show one example of how the accessory bracket supports an accessory on tube 22. The cantilever effect of the weight and position of the shelf 84 weights the support 78. The first node 72 is held on the first side of the tube 22 by the downward force of the support 78 and accessory 84. The node 72 acts as a fulcrum. The attachment arm 76 and first node 72 causes the second node 74 to press inwardly on the second side of the tube 22, opposite the first side and together the nodes 72, 74 pinch the tube, which causes the accessory bracket 70 to be releasably secured to the tube. The alignment of the magnets 60 and the inserts 80 ensures that the bracket 70 is located in a desired position. When the accessory bracket 70 is attached to the tube 22, the magnets 60 and inserts 80 each rotate to a position that is magnetically mutually attractive, which assists in the positioning of the accessory bracket on the tube and helps keep it in place.

Figure 20:
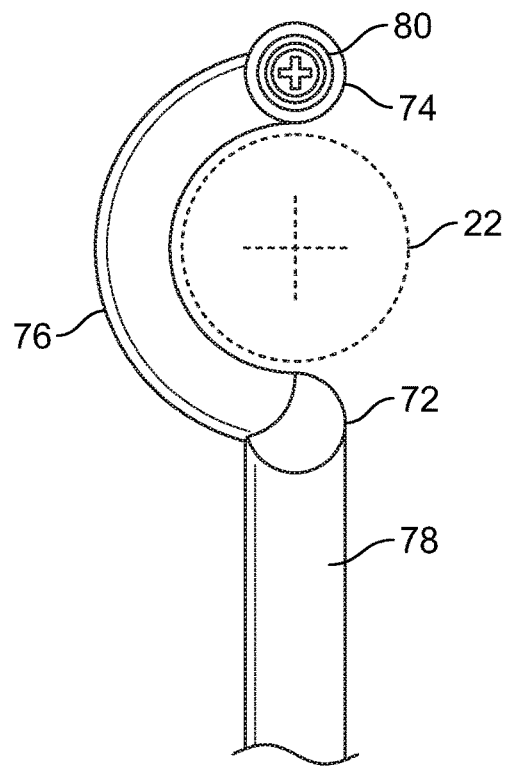
FIG. 20 is a top view of an accessory bracket disposed about a tube.
Figure 21:
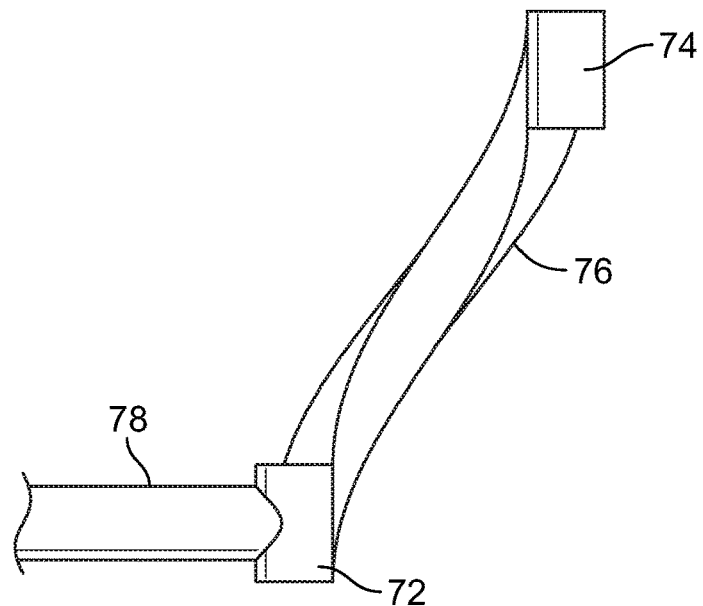
FIG. 21 is a side view of the accessory bracket of FIG. 20.

FIGS. 18-21 show various views of the accessory bracket 70. First and second nodes 72, 74 each includes a magnet or magnetic insert 80. The insert 80 may be fixed in position or rotatable within the node. An attachment arm 76 interconnects the first node 72 to the second node 74 with a configuration that positions the second node 74 vertically above the first node 72 in the orientation of the figure and on a vertically oriented tube when connected thereto. FIG. 20 shows the curved configuration of the attachment arm 76 that permits the arm to wrap about the tube 22 and position the first and second nodes 72, 74 on opposing sides of the tube. The accessory support 78 extends from the first node 72 and away from the tube 22.

Figure 22:
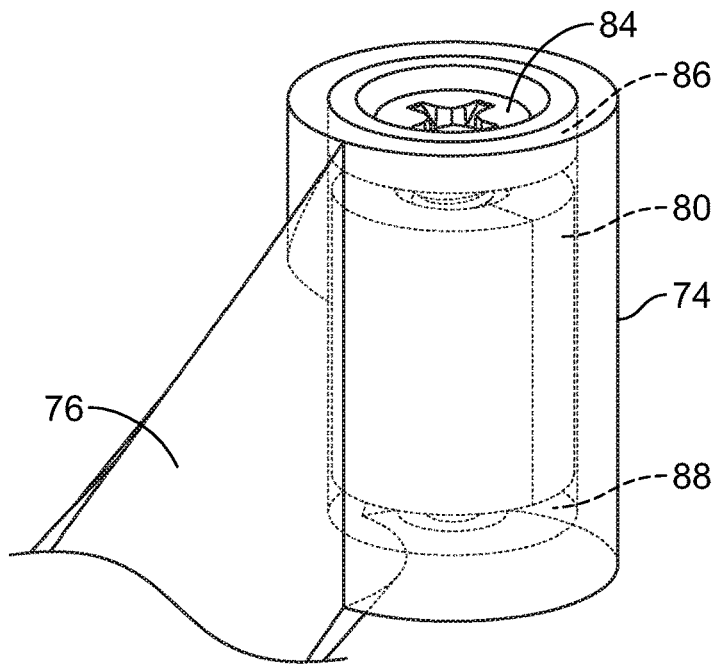
FIG. 22 is a cutaway perspective view of a portion of an accessary bracket.
Figure 23:
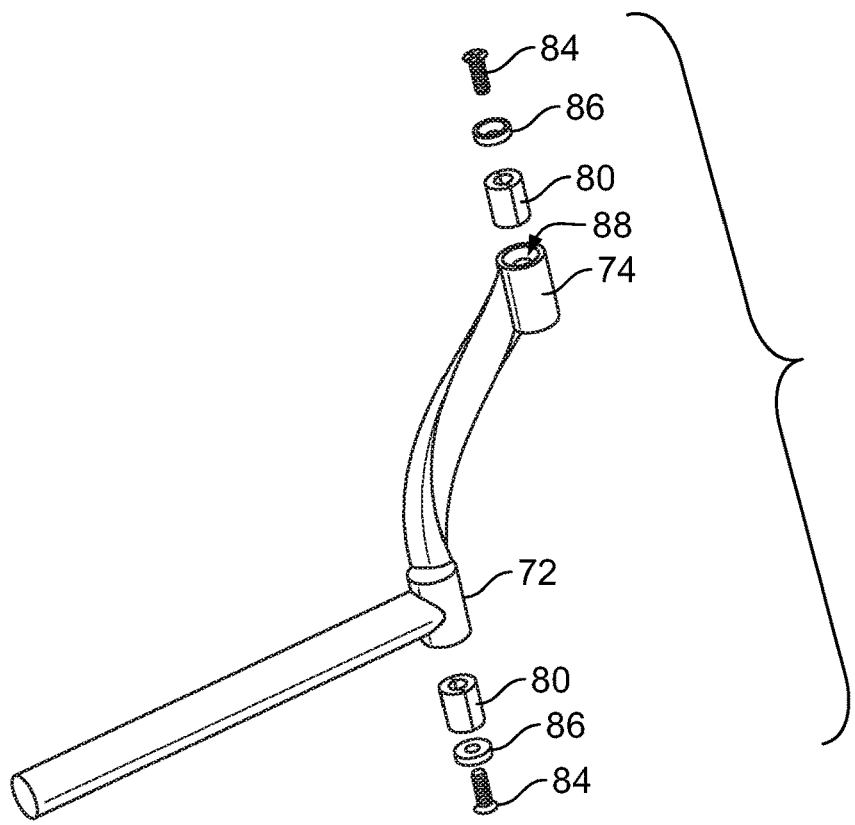
FIG. 23 is an exploded view of the accessory bracket of FIG. 21.

FIG. 22 shows the second node 74 and the insert 80 in place within the material of the node. One embodiment of the second node 74 includes a compartment 88 in which the insert 80 is positioned. The insert 80 may be held in position with a fastener 84, such as a threaded screw. The fastener 84 may pass through a washer 86 that is fixed in position to close the compartment 88. The insert 80 may rotate within the compartment 88 or may be fixed in position. FIG. 23 shows an accessory bracket 70 in an exploded view with both first and second nodes 72, 74 constructed as in the embodiment of FIG. 22.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A display system, comprising:
a first display frame including a plurality of frame members interconnected by junction connectors, the plurality of frame members each having a hollow interior; and
one or more diametrically polarized magnets disposed to rotate freely within the hollow interior of at least one of the plurality of frame members;
wherein each of the junction connectors includes a connector body and a pair of tenons extending therefrom, wherein the pair of tenons is each sized and shaped to insert into one of the plurality of frame members;
wherein each of the pair of tenons includes one of the one or more magnets disposed thereon; and
wherein the connector body supports the pair of tenons, wherein each of the pair of tenons is disposed on the connector body at an angle of about 90 degrees.

2. The display system of claim 1, further including a plurality of diametrically polarized magnets, and wherein each of the plurality of frame members includes one of the plurality of diametrically polarized magnets rotatably disposed therein.

3. The display system of claim 1, wherein each of the plurality of frame members has a tube configuration.

4. The display system of claim 1, further including a magnetic assembly releasably secured to the at least one tenon, the magnetic assembly including a head portion that is sized and shaped to attach to the at least one tenon and a post extending from the head portion that rotatably supports one of the one or more magnets.

5. The display system of claim 1, wherein each of the plurality of frame members includes one of the one or more magnets disposed and rotatably supported therewithin at about a mid-point thereof.

6. The display system of claim 5, including a magnetic assembly sized and shaped to fit within at least one of the plurality of frame members, the magnetic assembly including one of the one or more magnets rotatably mounted thereon.

7. The display system of claim 6, including at least one said magnetic assembly disposed within each of the plurality of frame members.

8. The display system of claim 7, wherein said magnetic assembly includes a head portion and at least one post extending axially therefrom, the post rotatably supporting one of the one or more magnets.

9. The display system of claim 7, wherein said magnetic assembly includes a head portion and a pair of oppositely axially extending posts, each of the pair of posts supporting one of the one or more magnets.

10. The display system of claim 9, wherein each of the plurality of frame members includes the magnetic assembly fixed therein.

11. The display system of claim 9, wherein the magnetic assembly is fixed in place by peening the head portion in position.

12. A display system, comprising:
a first display frame including a plurality of frame members interconnected by junction connectors, the plurality of frame members each having a hollow interior;
one or more diametrically polarized magnets disposed to rotate freely within the hollow interior of at least one of the frame members; and
at least one accessory bracket comprising:
a first node and a second node;
one of a magnet and a ferrous insert disposed in at least one of the first and second nodes and configured to be magnetically coupled to one of the one or more diametrically polarized magnets of the display frame when positioned sufficiently close thereto;
an attachment arm connecting the first node to the second node and configured to space apart the first node from the second node a distance that positions the first node and the second node on opposite sides on one of the plurality of frame members; and
an accessory support extending from the first node and configured to support an accessory.

13. The display system of claim 12, wherein the second node is positioned vertically higher relative to the first node when the accessory bracket is positioned upon a vertically oriented one of the plurality of frame members.

14. The display system of claim 12, wherein the first node and the second node each include a diametrically polarized magnet that is configured to rotate freely.

15. A display system, comprising:
a first display frame including a plurality of frame members interconnected by junction connectors, the plurality of frame members each having a hollow interior;
one or more diametrically polarized magnets disposed to rotate freely within the hollow interior of at least one of the plurality of frame members;
wherein each of the junction connectors includes a connector body and at least one tenon extending therefrom, wherein the at least one tenon is sized and shaped to insert into one of the plurality of frame members; and
a magnetic assembly releasably secured to the at least one tenon, the magnetic assembly including a head portion that is sized and shaped to attach to the at least one tenon and a post extending from the head portion that rotatably supports one of the one or more magnets.

16. A display system, comprising:
a first display frame including a plurality of frame members interconnected by junction connectors, the plurality of frame members each having a hollow interior;
one or more diametrically polarized magnets disposed to rotate freely within the hollow interior of at least one of the plurality of frame members;
wherein each of the plurality of frame members includes one of the one or more magnets disposed and rotatably supported therewithin at about a mid-point thereof; and
a magnetic assembly sized and shaped to fit within each of the plurality of frame members, the magnetic assembly including one of the one or more magnets rotatably mounted thereon;
wherein the magnetic assembly includes a head portion and at least one post extending axially therefrom, the post rotatably supporting one of the one or more magnets.

17. The display system of claim 16, wherein said magnetic assembly includes a head portion and a pair of oppositely axially extending posts, each of the pair of posts supporting one of the one or more magnets.

18. The display system of claim 17, wherein each of the plurality of frame members includes the magnetic assembly fixed therein.

19. The display system of claim 17, wherein the magnetic assembly is fixed in place by peening the head portion in position.

20. A display system, comprising:
a first display frame including a plurality of frame members interconnected by junction connectors, the plurality of frame members each having a hollow interior;
one or more diametrically polarized magnets disposed to rotate freely within the hollow interior of at least one of the plurality of frame members; and
a second display frame, the second display frame including a plurality of frame members interconnected by junction connectors, the plurality of frame members each having a hollow interior and one or more diametrically polarized magnets disposed to rotate freely within the hollow interior of at least one of the frame members of the second display frame;
wherein the one or more magnets of the first display frame and the one or more magnets of the second display frame are disposed to magnetically self-align and magnetically draw and couple the first display frame to the second display frame when the first display frame to the second display frame are positioned sufficiently close to each other.

* * * * *